US006309201B1

United States Patent
Gini

(10) Patent No.: US 6,309,201 B1
(45) Date of Patent: Oct. 30, 2001

(54) DIE FOR TUBULAR FILM EXTRUSION

(75) Inventor: Claudio Gini, Oleggio (IT)

(73) Assignee: Tecno Coating Engineering S.R.L., Marano Ticino (IT)

( * ) Notice: Subject to any disclaimer, the term of this patent is extended or adjusted under 35 U.S.C. 154(b) by 0 days.

(21) Appl. No.: 09/481,679

(22) Filed: Jan. 12, 2000

(30) Foreign Application Priority Data

Mar. 1, 1999 (IT) .............................................. MI99A0405

(51) Int. Cl.[7] .................................................. B29C 47/22
(52) U.S. Cl. .......................... 425/141; 425/381; 425/465; 425/466
(58) Field of Search ..................................... 425/141, 381, 425/465, 466; 264/167, 209.2

(56) References Cited

U.S. PATENT DOCUMENTS 4,382,766 * 5/1983 Feuerherm .............................. 425/465
4,548,570 * 10/1985 Hahn et al. ............................ 425/141
4,781,562 * 11/1988 Sano et al. ............................. 425/141
5,208,047 * 5/1993 Cloeren et al. ........................ 425/141
5,273,421 * 12/1993 Kanoh et al. .......................... 425/466
5,462,423 * 10/1995 Beckwith ............................... 425/141

* cited by examiner

Primary Examiner—Nam Nguyen
Assistant Examiner—Joseph S Del Sole
(74) Attorney, Agent, or Firm—Young & Thompson

(57) ABSTRACT

The die includes a central core and an annular ring arranged around the core, so as to define an annular slit for extruding a material, as well as a multiple number of inserts peripherally arranged around the ring and mechanically tied to the same, and device for heating the inserts independently from each other, so as to be able to change by thermal deformation of the inserts, the thickness of the annular slit. The inserts are radially arranged around the ring and attached to the structure of the machine on the inner side, next to the ring, while their free opposite extremities are free to radially slide so as to expand toward the out. Devices mechanically tie the inserts to the ring and devices heat and/or cool the inserts.

6 Claims, 2 Drawing Sheets

DIE FOR TUBULAR FILM EXTRUSION

FIELD OF THE INVENTION

This invention proposes a die for the extrusion of tubular films, fitted with improved devices for controlling and adjusting the thickness of the extrusion slit.

More specifically, it deals with a die of a type comprising a central core and an outer ring defining an annular slit between them, through which the molten material is extruded, as well as suitable means for heating one or more sections of said ring so as to locally deform it and vary the thickness of the respective length of the annular slit, where certain devices, in particular inserts, are affixed to the structure next to said ring in such a manner that their opposite extremities are free to radially slide as a result of thermal expansion, and where moreover certain devices are available to mechanically attach the freely sliding extremities of the inserts to said ring, and some other devices are used to heat and/or cool one or more of said inserts, independently of each other.

As shown in the following description, this solution allows achieving a quicker and more precise adjustment of the annular slit, so as to produce a perfectly uniform film at the outlet of the die.

BACKGROUND OF THE INVENTION

As is known, in order to produce tubular films the molten plastic material is extruded through a die comprising a central core and an outer ring surrounding said core at a close distance, so as to define an annular slit through which the tubular film is extruded.

The molten plastic material is directed toward said slit through a number of channels provided at the interface of said core and said outer ring or sleeve, channels which are uniformly distributed over its entire perimeter and which are branching out when approaching the extruding slit.

Despite the precision these dies are built with, it frequently happens that the thickness of the tubular film is not perfectly uniform, for instance as a result of an irregular flow of the material.

In order to limit this drawback, some dies have been developed in which the outer panel is built with a number of separate sectors each of which is associated with a heating element, and certain other devices mechanically acting on the ring so as to locally deform it according to the shifts caused by the motions generated by the technical deformations of certain sectors of the ring.

An example of such structures is shown in a simplified manner in FIG. 1, which illustrates, in a cross-sectional view, a known device for the localized adjustment of the extrusion slit.

The number 1 in FIG. 1 indicates the core of the die, number 2 the body of the outer ring surrounding the core and number 3 the annular extrusion slit expelling the material.

A multiple number of inserts 4 are radially arranged around the ring and mounted on an annular supporting structure indicted by the number 5.

An adjusting screw 6 allows regulating the position of the inserts, by approaching or moving them away from the ring 2.

Once this setting position has been defined, the inserts are tightened down in their positions.

The inside of each insert holds an electrical resistance 23 and a conduit 7 allowing the passage of cooling fluid.

A certain space is allowed between the ring 2 and the insert 4, so as to allow the insert to freely expand when heated.

A tie-down element such as a small anchor 8 or similar rigidly connects each insert of the ring 2.

This system allows it to locally vary the thickness of the extrusion slit, while heating or cooling the insert 4. It has the drawback, however, of combining two conflicting features.

In order to locally reduce the thickness of the extruded tubular material, the insert must in fact be heated so as to allow it to expand and push in the lip of the ring in the direction of the central core 1, thus slightly restricting the outlet slit 3.

A change in the slit diameter of about two tenths of a millimeter requires an insert temperature rise of about 100–150°.

It may then happen that despite a provision for an appropriate heat insulation between the inserts and the ring, part of the evolving heat will pass through the ring and heat the outflowing material, making it more fluid and free-flowing and consequently boosting its flow rate.

The efficacy of the mechanical deformation imparted to the ring is consequently partly annulled by the viscosity reduction of the material, resulting from the temperature increase.

SUMMARY OF THE INVENTION

In order to avoid this drawback, this invention now offers an improved die, in which the inserts are tied to the structure on its inner side, meaning the side facing the core, while leaving their opposite extremities free to move next to the peripheral section.

The system will then operate in a manner opposite to that of the known devices, because the heating of the inserts will cause the width of the slit to increase, while a cooling of the respective inserts will cause the width of the passage to be decreased.

In this way the heating action combines with the mechanical action, leading to a more efficient operation of the die, which allows achieving the desired purpose with a lower temperature change, and therefore also to act more quickly.

DETAILED DESCRIPTION OF THE INVENTION

Figure 1:
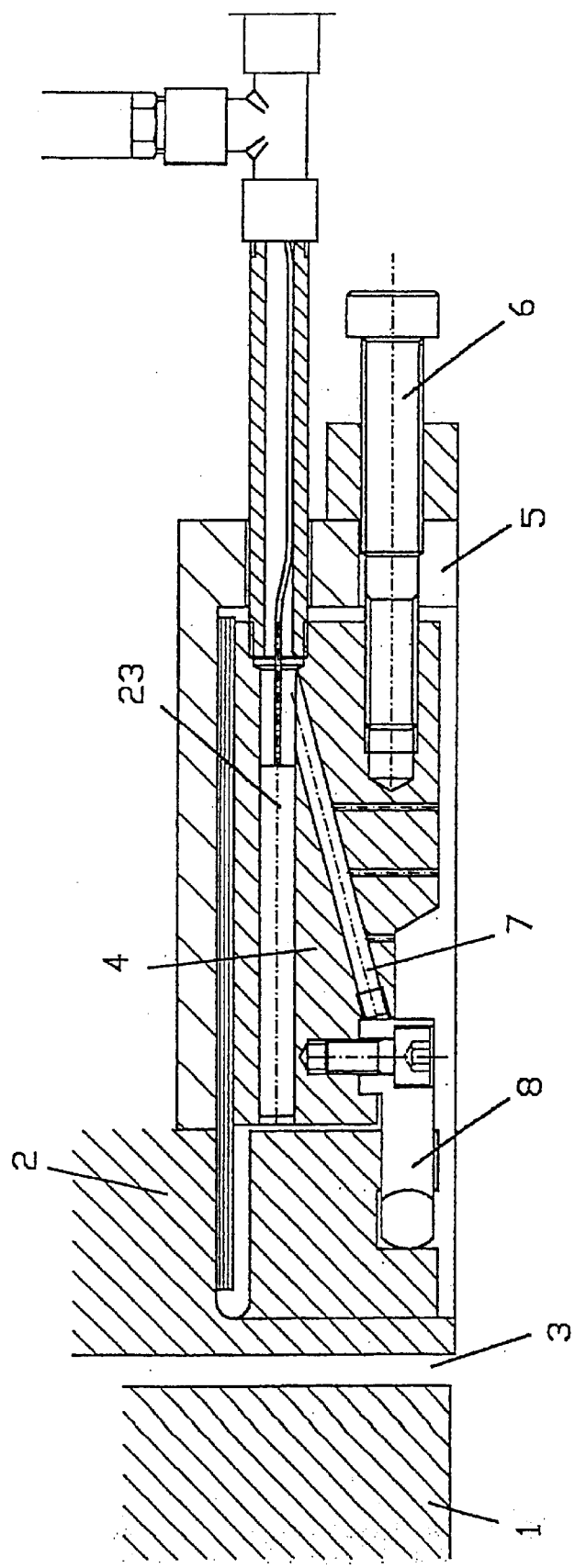
FIG. 1 illustrates, in a cross-sectional view, a known device for the localized adjustment of the extrusion slit.
Figure 2:
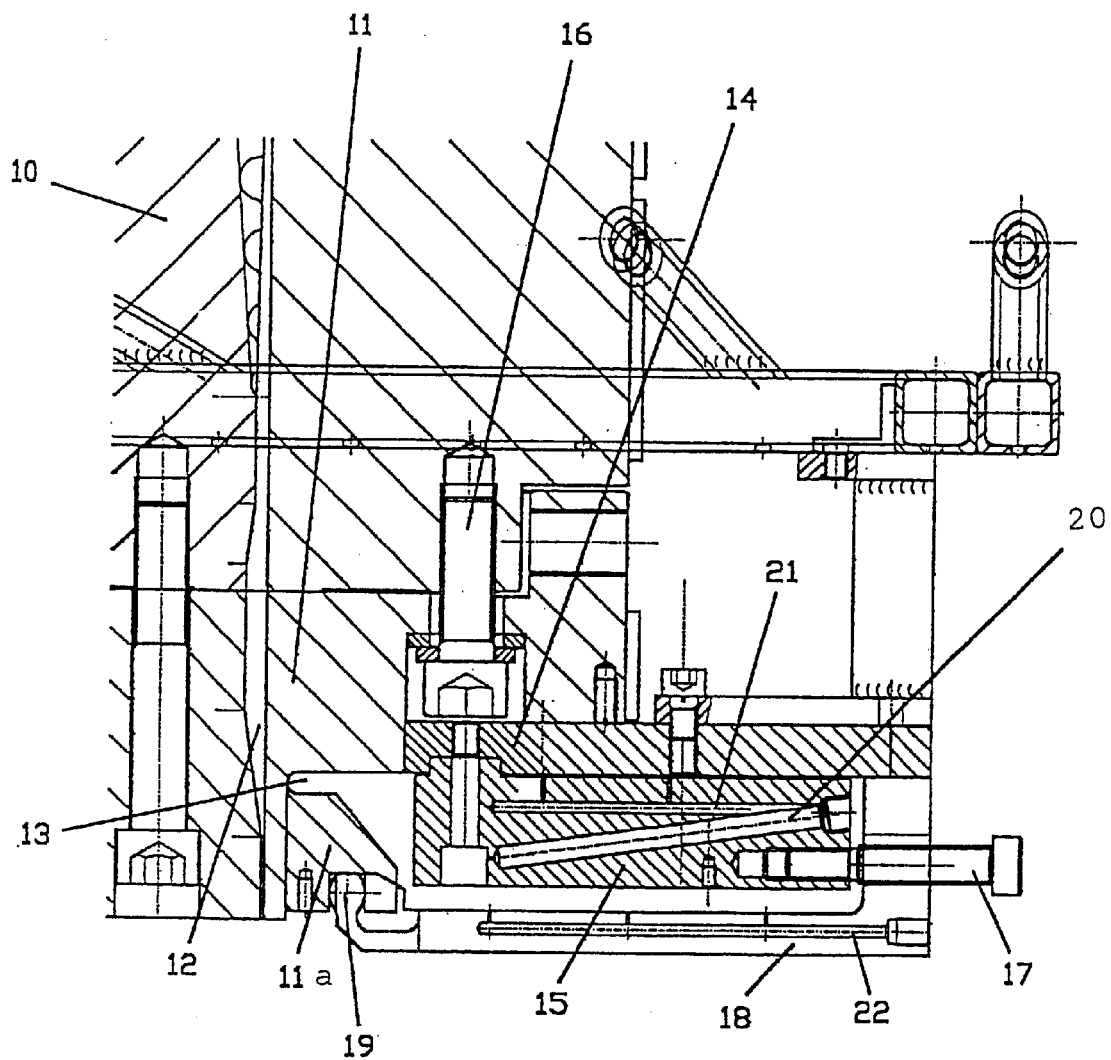
FIG. 2 illustrates, in a cross-sectional view, an adjusting device for the extrusion die according to the invention.

The number 10 of FIG. 2 indicates the core of a die surrounded, as in the previous case, by a ring 11 so as to define between these two elements an annular slit 12 capable of passing the molten plastic material which produces the tubular element.

The ring 11 presents a section of lesser thickness marked by the number 13, which allows the upper part of the ring to flex slightly, so as to allow the lip 11a to approach or move away from the core.

An insert marked by the number 15 is attached, with an interposed layer of insulating material 14, to the body of the ring 11.

The insert is blocked by a screw 16 as its extremity which is next to the lip 11a of the ring 11.

The opposite extremity of the insert 15, next to the peripheral portion of the head, is on the other hand left free to slide in a radial direction, and holds by an adjusting screw 17 a small anchor 18 equipped with a head 19 fitting into a corresponding seat provided in the lip 11a of ring 11.

The screw 17 allows adjusting the position of the small anchor 18 and therefore of the lip 11a with respect to the insert 15.

The inside of the insert houses an electrical resistance 20 while providing some passages for a cooling fluid, shown by the numbers 21 and 22, respectively, one in the body of the inset and the other in the body of the smaller anchor 18.

The conduit 22 is permanently attached to a device of known type for feeding and circulating the cooling fluid, so as to keep the small anchor at a constant temperature.

In the conduit 21, on the other hand, the fluid will be made to circulate only when it is necessary to cool the insert so as to achieve a direction of motion opposite to that induced by the heat generated by the resistance 20.

The operation is as follows:

The molten plastic material is fed by some known equipment not shown in the figure and conveyed to the slit 12, from which it exits to form the tubular element.

Whenever the thickness of the element is to be locally reduced, action is taken to pass the cooling fluid through the body of the insert 15, which shortens slightly due to the temperature drop.

This leads the smaller anchor 18 to push the lip 11a of the ring 11 toward the inside, thus locally restricting the extrusion slit 12.

If on the other hand the thickness of the tubular element is to be increased, the insert 15 must be heated.

The thermal expansion will at this point provoke a sliding motion of the insert's free extremity toward the outside, and also drag the small anchor 18 along in the same direction, thus exerting, by the head 19, a pulling action on the lip 11a of the ring 11, causing it to slightly bend in the area of its minimum thickness 13 and leading to an increase of the thickness of the extrusion slit.

This allows the material to flow out at a greater volume, and this effect is increased by the heating, which boosts the material's fluidity.

The result is a more efficient die, capable of producing the desired results at much smaller thermal excursions than those normally needed with the known equipment, and in a shorter time period.

An expert of the trade may also provide other modifications and variants, all of which shall however be deemed to fall within the same scope of this invention.

Due to the fact that the inner part of the insert, next to the ring, is firmly locked, the cooling will provoke a sliding motion of the free extremity in the direction of the center of the die.

What is claimed is:

1. A die for extrusion of a tubular film, the die comprising:
   a central core;
   an annular ring arranged around said core so as to define a body having an annular slit for extruding a material;
   a plurality of inserts peripherally arranged around said ring and mechanically attached to the body of said ring;
      devices for heating said inserts independently from each other, so as to be able to change, by thermal deformation of said inserts, the thickness of the annular slit;
      sides of said inserts facing said core are radially arranged around said ring and attached to the body of said ring, while sides of said insets opposite said core are free to radially slide so as to expand in a direction away from said core; and
      means for mechanically attaching said inserts to said ring.

2. The die according to claim 1, wherein said means for mechanically attaching said inserts to said ring comprise anchors or supports, each of said anchors attached to the side of an insert opposite said core and fitted with means for engaging said ring near said inserts.

3. The die according to claim 2, wherein said means for engaging said ring comprises a head firmly attached to said anchor, where said head is inserted in a seat provided in said ring.

4. The die according to claim 1, further comprising adjusting screws for regulating the mounting position of said anchors or said supports on said inserts.

5. The die according to claim 1, further comprising means for circulating a cooling fluid through said inserts and said anchors.

6. The die according to claim 5, further comprising means for independently regulating circulation of the cooling fluid through said inserts and said anchors.

* * * * *